United States Patent
Santiago et al.

(10) Patent No.: US 12,355,043 B2
(45) Date of Patent: Jul. 8, 2025

(54) THERMAL MANAGEMENT STRUCTURE FOR BATTERY ARRAY

(71) Applicant: Ford Global Technologies, LLC, Dearborn, MI (US)

(72) Inventors: Jeremy Santiago, Ann Arbor, MI (US); Richard Werth, Milan, MI (US); Mark Meinhart, Dexter, MI (US); Yamini Yedetore, Champaign, IL (US)

(73) Assignee: Ford Global Technologies, LLC, Dearborn, MI (US)

( * ) Notice: Subject to any disclaimer, the term of this patent is extended or adjusted under 35 U.S.C. 154(b) by 611 days.

(21) Appl. No.: 17/714,403

(22) Filed: Apr. 6, 2022

(65) Prior Publication Data

US 2023/0327230 A1 Oct. 12, 2023

(51) Int. Cl.
| | |
|---|---|
| *H01M 10/647* | (2014.01) |
| *B33Y 80/00* | (2015.01) |
| *B60L 50/64* | (2019.01) |
| *B60L 58/26* | (2019.01) |
| *H01M 10/613* | (2014.01) |
| *H01M 10/625* | (2014.01) |

(Continued)

(52) U.S. Cl.
CPC ........... *H01M 10/647* (2015.04); *B33Y 80/00* (2014.12); *B60L 50/64* (2019.02); *B60L 58/26* (2019.02); *H01M 10/613* (2015.04); *H01M 10/625* (2015.04); *H01M 10/653* (2015.04); *H01M 10/6567* (2015.04); *B60L 2240/545* (2013.01); *H01M 2220/20* (2013.01)

(58) Field of Classification Search
CPC ............. H01M 10/647; H01M 10/613; H01M 10/625; H01M 10/653; H01M 10/6567; H01M 2220/20; H01M 10/655; H01M 10/6556; B33Y 80/00; B60L 50/64; B60L 58/26; B60L 2240/545; Y02E 60/10
See application file for complete search history.

(56) References Cited

U.S. PATENT DOCUMENTS

| | | | | |
|---|---|---|---|---|
| 9,961,808 B2 * | 5/2018 | Lei | ........................ | H02M 7/003 |
| 10,014,794 B2 * | 7/2018 | Lei | ............................ | H02B 1/20 |

(Continued)

FOREIGN PATENT DOCUMENTS

| | | | | |
|---|---|---|---|---|
| CN | 110429359 A | * | 11/2019 | .............. B60L 58/26 |
| CN | 110636742 A | * | 12/2019 | |

(Continued)

OTHER PUBLICATIONS

Translated DE-102016119967-A1 (Year: 2024).*

(Continued)

*Primary Examiner* — James A Shriver, II
*Assistant Examiner* — Ian Bryce Shelton
(74) *Attorney, Agent, or Firm* — Burris Law, PLLC (57) ABSTRACT

A thermal management structure for a battery pouch of a vehicle battery pack includes a plurality of walls. The plurality of walls include a pair of outer walls and an intermediate wall. Each outer wall is in a heat transfer relationship with a respective outer side of the battery pouch. The intermediate wall is disposed between the pair of outer walls and is in a heat transfer relationship with an inner side of the battery pouch. Each of the outer walls includes a first lattice structure and the intermediate wall includes a second lattice structure.

20 Claims, 8 Drawing Sheets

(51) Int. Cl.
  *H01M 10/653*  (2014.01)
  *H01M 10/6567* (2014.01)

(56) References Cited

U.S. PATENT DOCUMENTS

| | | | | |
|---|---|---|---|---|
| 10,017,073 | B2* | 7/2018 | Lei | B60L 50/61 |
| 10,199,697 | B2* | 2/2019 | Addanki | H01M 10/625 |
| 10,283,824 | B2* | 5/2019 | Moschet | F28F 1/025 |
| 10,746,479 | B2* | 8/2020 | Rush | B33Y 80/00 |
| 10,749,225 | B2* | 8/2020 | Robert | H01M 50/291 |
| 10,886,512 | B2* | 1/2021 | Bourke | B60L 58/26 |
| 11,015,872 | B2* | 5/2021 | Aston | H05K 7/20254 |
| 11,022,375 | B2* | 6/2021 | Bucknell | B33Y 10/00 |
| 11,189,872 | B2* | 11/2021 | Drews | H01M 10/6554 |
| 12,030,655 | B2* | 7/2024 | Zagrodnik | B64C 29/0033 |
| 12,100,798 | B2* | 9/2024 | Naka | H01M 10/0481 |
| 2017/0346144 | A1* | 11/2017 | Addanki | H01M 50/271 |
| 2018/0219191 | A1* | 8/2018 | Drews | H01M 10/647 |
| 2018/0269547 | A1* | 9/2018 | Robert | H01M 10/6554 |
| 2019/0097287 | A1* | 3/2019 | Pflueger | H01M 10/6567 |
| 2019/0373773 | A1* | 12/2019 | Bougher | B29C 64/106 |
| 2020/0220132 | A1* | 7/2020 | Bourke | B60L 58/25 |
| 2021/0376370 | A1* | 12/2021 | Naka | H01M 50/342 |
| 2022/0373268 | A1* | 11/2022 | Al-Hallaj | H01M 50/213 |
| 2022/0402620 | A1* | 12/2022 | Zagrodnik | H01M 50/358 |

FOREIGN PATENT DOCUMENTS

| | | | | |
|---|---|---|---|---|
| CN | 110994072 A | * | 4/2020 | |
| CN | 111509325 A | * | 8/2020 | B60H 1/00278 |
| CN | 112138753 | | 12/2020 | |
| CN | 110636742 | | 2/2021 | |
| CN | 215864862 U | * | 2/2022 | F28D 1/035 |
| DE | 102016119967 A1 | * | 5/2017 | B60K 6/28 |
| EP | 2930587 | | 10/2015 | |
| KR | 20170049654 A | * | 5/2017 | |

OTHER PUBLICATIONS

Current Automotive, How Much Does a Tesla Model 3 Battery Replacement Cost?, 2023, 8 pages, available at URL https://www.currentautomotive.com/how-much-does-a-tesla-model-3-battery-replacement-cost/.
Wang, et al., 3D Printed Micro-channel Heat Sink Design Considerations, PowerPoint Presentation for the International Symposium on 3D Power Electronics Integration and Manufacturing, Jun. 13-15, 2016, 27 pages, Crane Aerospace & Electronics.
Temisth, GPU Cooling and Additive Manufacturing, available at URL http://temisth.com/gpu-cooling-part01/, 2023.

* cited by examiner

THERMAL MANAGEMENT STRUCTURE FOR BATTERY ARRAY

FIELD

The present disclosure relates to a thermal management structure for a battery array of a vehicle battery tray.

BACKGROUND

The statements in this section merely provide background information related to the present disclosure and may not constitute prior art.

The desire to reduce automotive fuel consumption and emissions has been well documented. Thus, electric vehicles have been developed to significantly reduce reliance on internal combustion engines. In general, electric vehicles differ from conventional motor vehicles because they are driven by one or more rechargeable battery packs having lithium-ion batteries, for example, or any other suitable electrical power storage units. The battery pack typically powers one or more motors to drive a set of wheels. The structure surrounding and supporting the battery packs must also adequately cool the battery packs, especially for vehicles capable of traveling long distances (e.g., electric vehicles capable of traveling more than 500 miles).

The thermal management of the battery packs, among other issues related to the battery packs, are addressed by the present disclosure.

SUMMARY

This section provides a general summary of the disclosure and is not a comprehensive disclosure of its full scope or all of its features.

In one form, the present disclosure provides a thermal management structure for a battery pouch of a vehicle battery pack. The thermal management structure comprises a plurality of walls. The plurality of walls comprise first and second outer walls and an intermediate wall. Each of the first and second outer walls is in a heat transfer relationship with a respective outer side of the battery pouch. The intermediate wall is disposed between the first and second of outer walls and is in a heat transfer relationship with an inner side of the battery pouch. Each of the first and second outer walls includes a first lattice structure and the intermediate wall includes a second lattice structure.

In variations of the thermal management structure of the above paragraph, which may be implemented individually or in any combination: the thermal management structure is additively manufactured; the first lattice structures are internal lattice structures disposed within the first and second outer walls and the second lattice structure is an internal lattice structure disposed within the intermediate wall; the first and second lattice structures are different; the plurality of walls further comprise a bottom wall in a heat transfer relationship with a lower side of the battery pouch and configured to support the battery pouch, the bottom wall comprises a third lattice structure; the third lattice structure is an internal lattice structure disposed within the bottom wall; the plurality of walls further comprise a front wall configured to cover a front side of the battery pouch, a back wall configured to cover a back side of the battery pouch, and a top wall configured to cover a top side of the battery pouch; the first, second, and third lattice structures are gyroid lattice structures; each of the first and second outer walls contacts the respective outer side of the battery pouch to provide for the heat transfer relationship by thermal conduction between the first and second outer walls and the respective outer sides of the battery pouch, the intermediate wall contacts the inner side of the battery pouch to provide for the heat transfer relationship by thermal conduction between the intermediate wall and the inner side of the battery pouch; the first and second of outer walls and the intermediate wall are oriented vertically; each of the first and second outer walls comprises a first internal flow divider that separates the first and second outer walls into first and second flow regions, the intermediate wall comprises a second internal flow divider that separates the intermediate wall into second and third flow regions, and the bottom wall comprises a third internal flow divider that separates the bottom wall into fourth and fifth flow regions; the intermediate wall comprises a fourth internal flow divider and a fifth flow divider extending parallel to the second internal flow divider, the fourth flow divider disposed within the second flow region and separating the second flow region into first and second sub flow regions, the fifth flow divider disposed within the third flow region and separating the third flow region into third and fourth sub flow regions, and the bottom wall comprises a sixth internal flow divider extending perpendicular to the third internal flow divider, the sixth internal flow divider separating each of the fourth and fifth flow regions into fifth and sixth sub flow regions; and the first and second outer walls and the intermediate wall are in fluid communication with each other.

In another form, the present disclosure provides a thermal management structure for a battery pouch of a vehicle battery pack. The thermal management structure comprises a plurality of walls. The plurality of walls comprise a pair of outer walls, an intermediate wall, and a bottom wall. Each outer wall is in a heat transfer relationship with a respective outer side of the battery pouch. The intermediate wall is disposed between the pair of outer walls and is in a heat transfer relationship with an inner side of the battery pouch. The bottom wall is in a heat transfer relationship with a lower side of the battery pouch and is configured to support the battery pouch. Each of the outer walls includes a first lattice structure, the intermediate wall includes a second lattice structure, and the bottom wall comprises a third lattice structure.

In yet another form, the present disclosure provides a thermal management structure manufactured by an additive manufacturing process.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
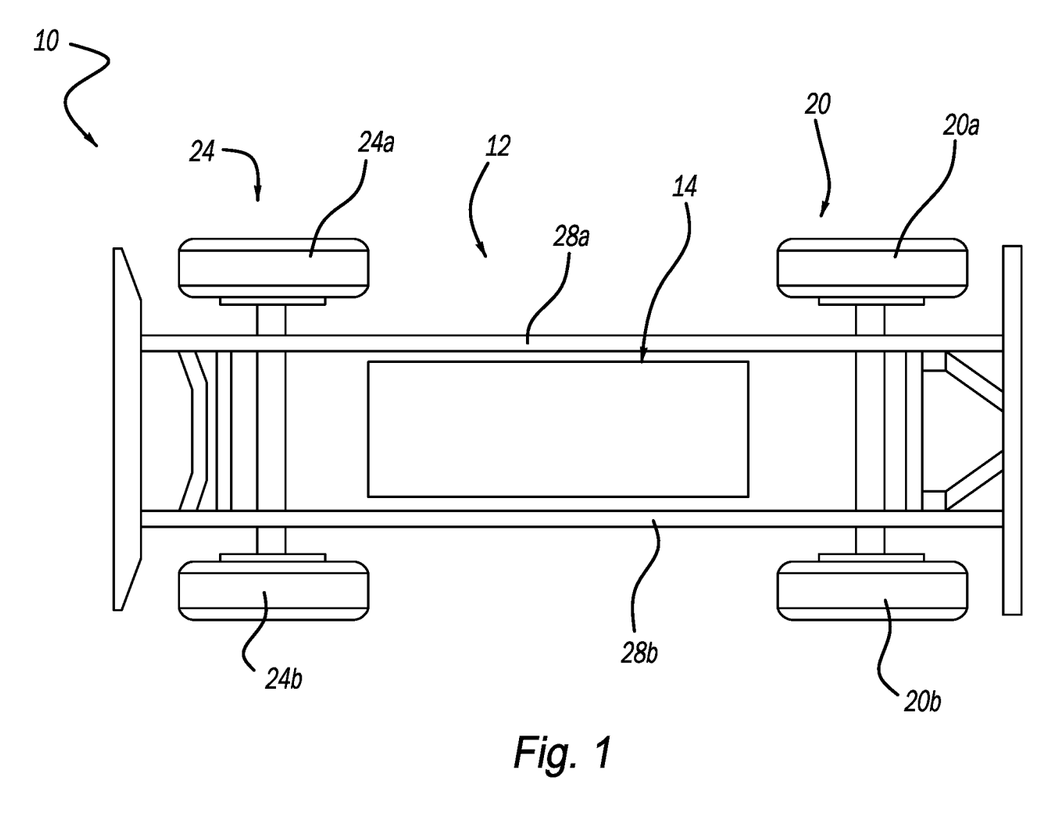
FIG. 1 is a schematic view of a vehicle including a battery housing assembly according to the principles of the present disclosure.

With reference to FIG. 1, a vehicle 10 such as an electric vehicle is shown. In the example provided, the electric vehicle is a battery electric vehicle (BEV). In other examples, the electric vehicle may be a hybrid electric vehicle (HEV), a plug-in electric vehicle (PHEV), or a fuel cell vehicle, among others. The vehicle 10 includes a vehicle frame 12 and a battery housing assembly 14. The vehicle frame 12 is the main supporting structure of the vehicle 10, to which various components are attached either directly or indirectly. The vehicle frame 12 includes opposed longitudinal rails 28a, 28b. The rails 28a, 28b are spaced apart from each other and may establish a length of the vehicle frame 12.

The battery housing assembly 14 powers a rear motor (not shown) to drive rear wheels 20a, 20b of a set of rear wheels 20 via a rear axle. Similarly, the battery housing assembly 14 powers a front motor (not shown) to drive front wheels 24a, 24b of a set of front wheels 24 via a front axle.

Figure 2:
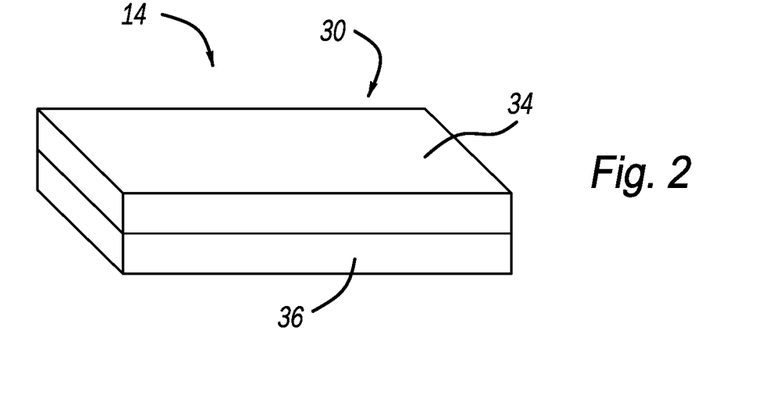
FIG. 2 is a perspective view of the battery housing assembly of FIG. 1.
Figure 3A:
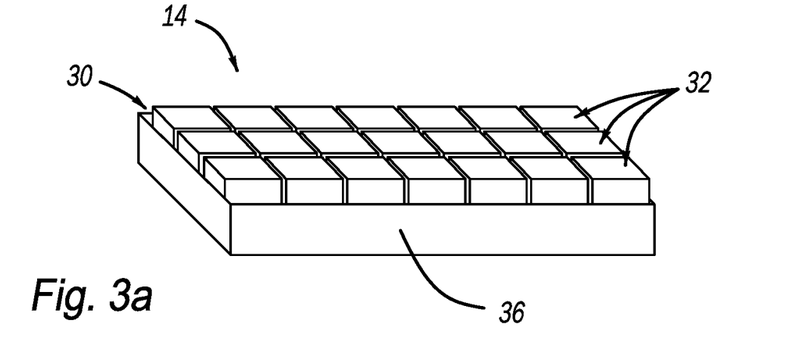
FIG. 3a is another perspective view of the battery housing assembly of FIG. 1 with a lid of the battery housing assembly removed for clarity.
Figure 3B:
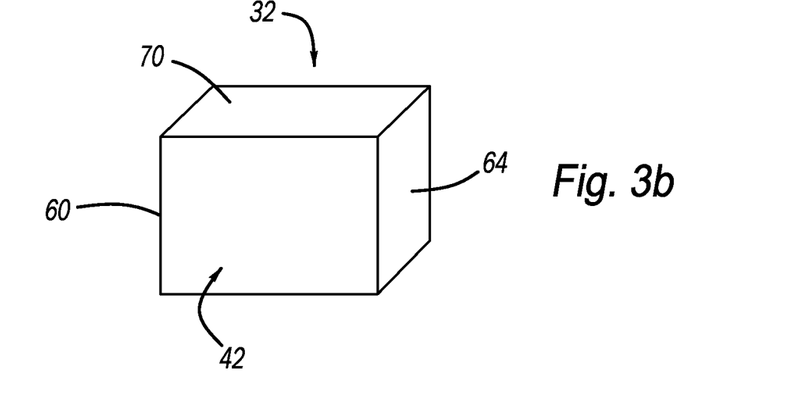
FIG. 3b is a schematic view of a battery array of the battery housing assembly of FIG. 1.
Figure 4:
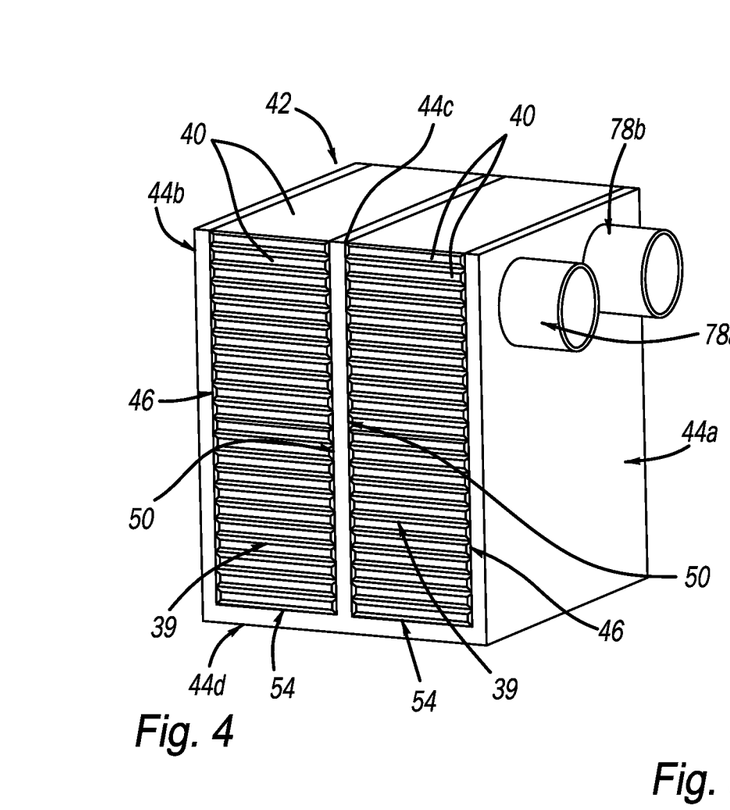
FIG. 4 is a perspective view of a thermal management structure of one battery array.
Figure 5:
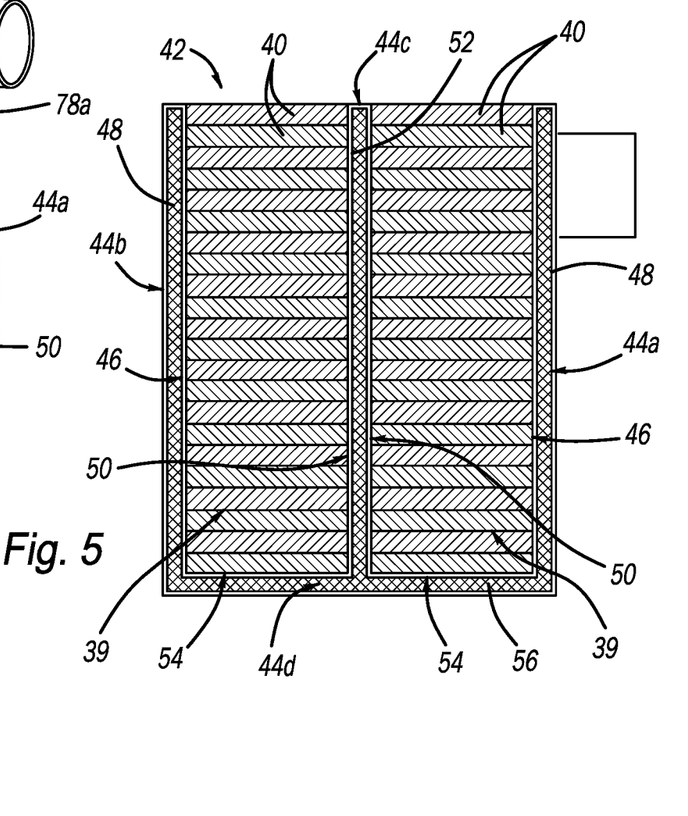
FIG. 5 is a cross-sectional view of the thermal management structure of FIG. 4.

With reference to FIGS. 2, 3a and 3b, the battery housing assembly 14 includes a battery tray or housing 30 (FIGS. 2 and 3a) and one or more battery arrays 32 (FIGS. 3a and 3b). The battery housing 30 is an enclosure which provides a structural surrounding and sealed compartment for the battery arrays 32 and other battery components such as cooling lines, support brackets, and wiring disposed therein or extending therethrough. The battery housing 30 may disposed at various locations of the vehicle 10 and is mounted to the vehicle frame 12. In this way, the battery housing 30 is supported by the vehicle frame 12 and is remote from a passenger cabin (not shown) and cargo compartments (not shown) of the vehicle 10, therefore, not occupying space that would otherwise be available for passengers or cargo. The battery housing 30 includes a cover or lid 34, a body 36, and a seal (not shown). The lid 34 is removably coupled to the body 36 via mechanical fasteners such as bolts or screws (not shown), for example. In this way, the lid 34 may be removed to service the battery arrays 32 disposed within the battery housing 30. The seal is disposed around a periphery of the body 36 and is engaged with the body 36 and the lid 34. In this way, fluids, debris and other materials are inhibited from entering into the battery housing 30.

With additional reference to FIGS. 4-9, the battery arrays 32 may be rechargeable and may include battery pouches 39 (FIGS. 4 and 5) formed by battery cells 40 (e.g., lithium-ion batteries or any other suitable electrical power storage units) stacked on top of each other. Each battery array 32 comprises a thermal management structure 42 surrounding and supporting the battery pouches 39. The battery arrays 32 are in fluid communication with each other via connecting lines (not shown). In this way, fluid such as glycol, for example, is allowed to flow through the thermal management structure 42 of each battery array 32, thereby cooling the battery cells 40.

The thermal management structure 42 is in the form of a single unitized, monolithic structure that can be manufactured by an additive manufacturing process. The manufacturing process can include laser sintering, for example, that generally includes a laser, a means for applying subsequent layers of powdered sintering material (e.g., metal powder), and a controller that controls operation of the laser and the amount and timing of the deposition of the metal powder. It should be understood that other 3D printing/additive manufacturing methods may be employed to achieve the unitized, monolithic body, along with a variety of different materials, while remaining within the scope of the present disclosure.

Figure 7:
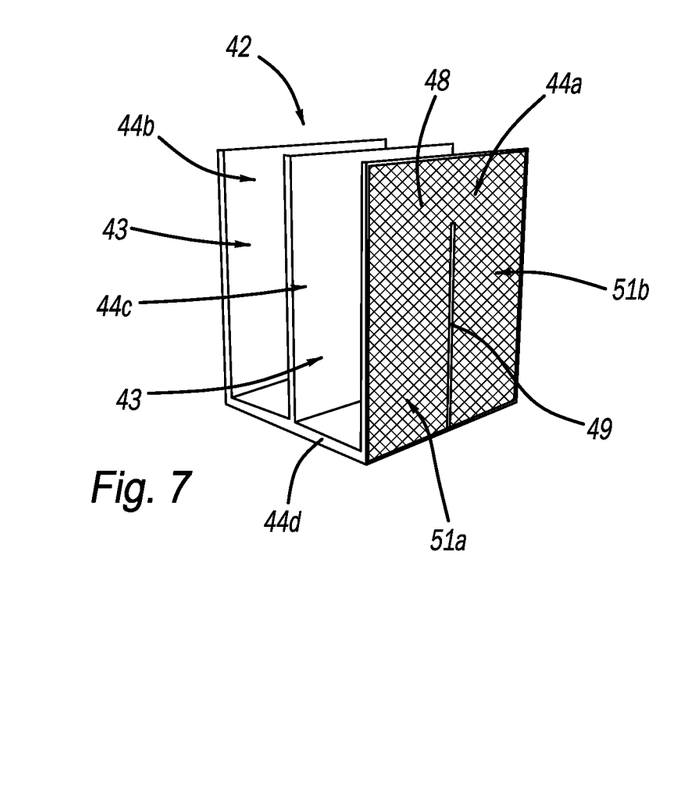
FIG. 7 is yet another cross-sectional view of the thermal management structure of FIG. 4.
Figure 8:
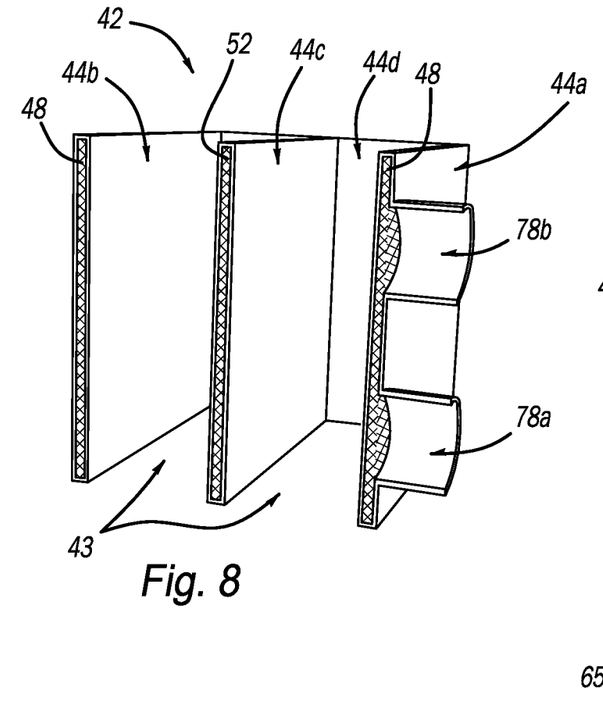
FIG. 8 is yet another cross-sectional view of the thermal management structure of FIG. 4.
Figure 11:
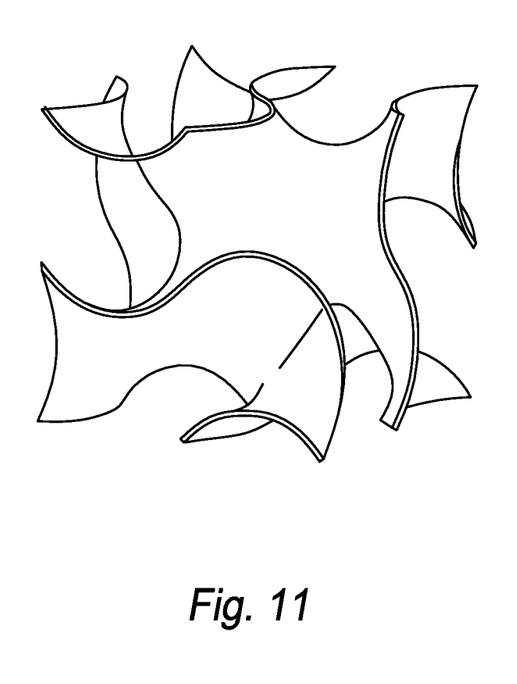
FIG. 11 is a perspective view of a gyroid lattice structure according to the principles of the present disclosure.

The thermal management structure 42 comprises a plurality of walls (e.g., a pair of outer walls 44a, 44b, an intermediate wall 44c, and a bottom wall 44d) that combine to form an "E-shape" cross-section, in one form of the present disclosure. In the example illustrated, each outer wall 44a, 44b is oriented vertically and in a heat transfer relationship with an outer side 46 of a respective battery pouch 39. In one example, an inside surface of each outer wall 44a, 44b contacts the outer side 46 of the respective battery pouch 39 such that heat generated by the battery pouch 39 is transferred to the outer wall 44a. As used herein, the term "heat transfer relationship" should be construed to mean an arrangement in which heat from the battery pouch 39 is directly or indirectly transferred to one or more walls of the thermal management structure 42 via thermal conduction. Each outer wall 44a, 44b also comprises a lattice structure 48 and at least one elongated fluid flow separator or divider 49 (only one shown in FIG. 7). The lattice structure 48 may be a gyroid lattice structure (FIG. 11), for example. In the example illustrated, the lattice structure 48 is an internal lattice structure disposed within the outer wall 44a, 44b and extending the entire area within the outer wall 44a, 44b. The fluid flow separator 49 is located within the outer wall 44a, 44b at or near a central area. The fluid flow separator 49 also extends from a bottom end of the outer wall 44a, 44b toward an upper end of the outer wall 44a, 44b. In this way, the outer wall 44a, 44b is separated into internal flow regions or zones 51a, 51b (FIG. 7).

Figure 6:
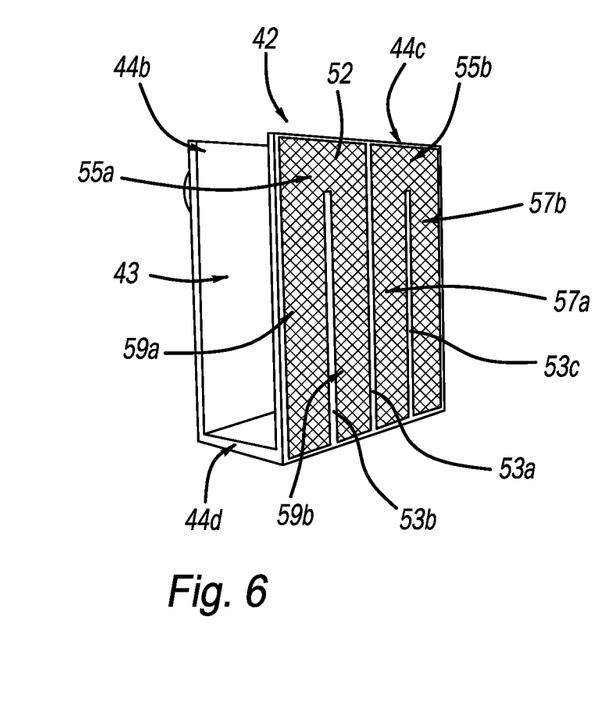
FIG. 6 is another cross-sectional view of the thermal management structure of FIG. 4.

In the example illustrated, the intermediate wall 44c is oriented vertically and positioned between the outer walls 44a, 44b. The intermediate wall 44c cooperates with the bottom wall 44d and a respective outer wall 44a, 44b to define a compartment 43 (FIG. 8) for a respective battery pouch 39. The intermediate wall 44c is also in a heat transfer relationship with an inner side 50 of two adjacent battery pouches 39. In one example, the intermediate wall 44c contacts the inner side 50 of the adjacent battery pouches 39 such that heat generated by the battery pouches 39 is transferred to the intermediate wall 44*c* via thermal conduction. The intermediate wall 44*c* also comprises a lattice structure 52 and a plurality of elongated fluid flow separators or dividers 53*a*, 53*b*, 53*c* (FIG. 6). The lattice structure 52 may be a gyroid lattice structure, for example. In the example illustrated, the lattice structure 52 is an internal lattice structure disposed within the intermediate wall 44*c* and extending the entire area within the intermediate wall 44*c*. The lattice structure 52 may be of a different type than the lattice structures 48 of the outer walls 44*a*, 44*b*.

As shown in FIG. 6, the fluid flow separator 53*a* is located within the intermediate wall 44*c* at or near a central area and extends from a bottom end of the intermediate wall 44*c* to an upper end of the intermediate wall 44*c*. In this way, the intermediate wall 44*c* is separated into internal flow regions or zones 55*a*, 55*b*. The fluid flow separator 53*b* is located within the flow region 55*a* of the intermediate wall 44*c* and extends from a bottom end of the intermediate wall 44*c* toward an upper end of the intermediate wall 44*c*. In this way, the flow region 55*a* is separated into sub flow regions or zones 59*a*, 59*b*. The fluid flow separator 53*c* is located within the flow region 55*b* of the intermediate wall 44*c* and extends from a bottom end of the intermediate wall 44*c* toward an upper end of the intermediate wall 44*c*. In this way, the flow region 55*b* is separated into sub flow regions or zones 57*a*, 57*b*.

Figure 9:
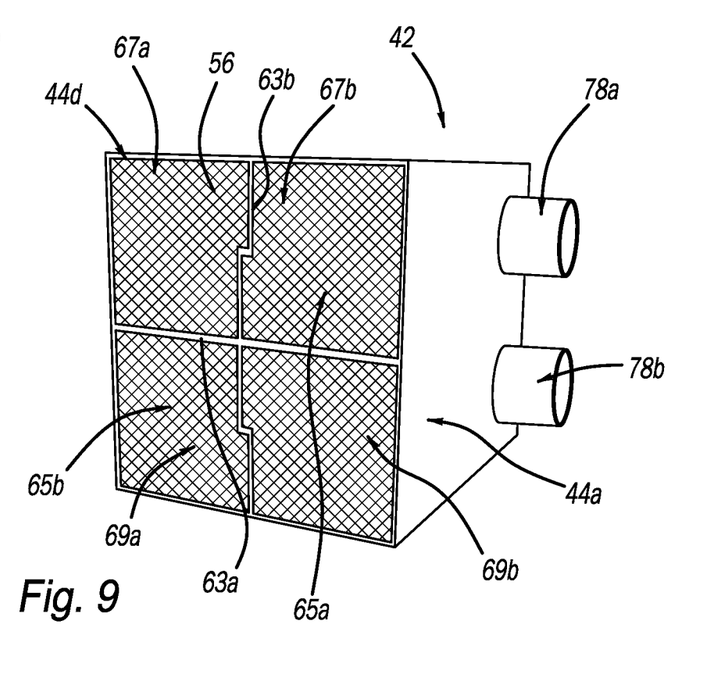
FIG. 9 is yet another cross-sectional view of the thermal management structure of FIG. 4.

The bottom wall 44*d* is oriented horizontally and in a heat transfer relationship with a lower side 54 of the battery pouches 39. In one example, an upper surface of the bottom wall 44*d* contacts the lower side 54 of the battery pouches 39 such that heat generated by the battery pouches 39 is transferred to the bottom wall 44*d* via thermal conduction. The bottom wall 44*d* also comprises a lattice structure 56 and a plurality of elongated fluid flow separators or dividers 63*a*, 63*b* (FIG. 9). The lattice structure 56 may be a gyroid lattice structure, for example. In the example illustrated, the lattice structure 56 is an internal lattice structure disposed within the bottom wall 44*d* and extending the entire area within the bottom wall 44*d*. The lattice structure 56 may be of a different type than the lattice structures 48 of the outer walls 44*a*, 44*a* and/or the lattice structure 52 of the intermediate wall 44*c*.

As shown in FIG. 9, the fluid flow separator 63*a* is located within the bottom wall 44*d* and extends from the outer wall 44*a* to the outer wall 44*b*. In this way, the bottom wall 44*d* is separated into internal flow regions or zones 65*a*, 65*b*. The fluid flow separator 63*b* is located within the bottom wall 44*d* and extends from a first end of the bottom wall 44*d* to a second end of the bottom wall 44*d* that opposes the first end. Stated differently, the fluid flow separator 63*b* extends perpendicular to the fluid flow separator 63*a*. In this way, the internal flow region 65*a* is further separated into sub flow regions 67*a*, 67*b* and the internal flow region 65*b* is further separated into sub flow regions 69*a*, 69*b*.

Figure 10:
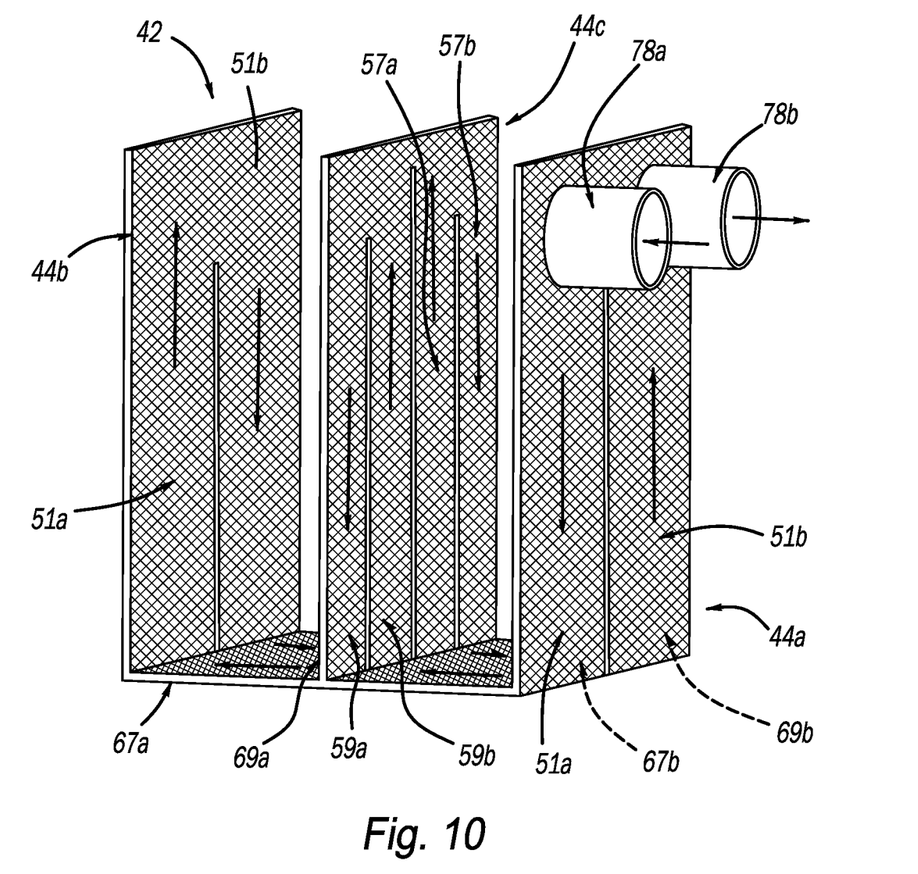
FIG. 10 is a perspective view of the thermal management structure showing a fluid flow path of fluid flow therethrough.

With reference to FIG. 10, a fluid flow path of cooling fluid such as glycol, for example, through the thermal management structure 42 is described in more detail. The fluid enters inlet conduit 78*a* where it flows downwardly through the flow region 51*a* of the outer wall 44*a*, laterally through the sub flow region 67*b* of the bottom wall 44*d*, upwardly through the sub flow region 59*b* of the intermediate wall 44*c*, downwardly through the sub flow region 59*a* of the intermediate wall 44*c*, laterally through sub flow region 67*a* of the bottom wall 44*d*, upwardly through flow region 51*a* of the outer wall 44*b*, downwardly through flow region 51*b* off the outer wall 44*b*, laterally through sub flow region 69*a* of the bottom wall 44*d*, upwardly through sub flow region 57*a* of the intermediate wall 44*c*, downwardly through sub flow region 57*b* of the intermediate wall 44*c*, laterally through sub flow region 69*b* of the bottom wall 44*d*, upwardly through flow region 51*b* of the outer wall 44*a*, and exits outlet conduit 78*b*. In this way, heat generated by the battery pouches is transferred to the fluid, thereby cooling the battery pouches 39 at various sides 46, 50, 54.

The flow dividers 49, 53*a*, 53*b*, 53*c*, 63*a*, 63*b* also direct the flow of coolant fluid through the thermal management structure 42 such that the desired cooling of the structure 42 is achieved. It should be understood that the sizing, configuration, orientation and/or number of the flow dividers included in the thermal structure 42 are configured differently to achieve the desired cooling through the thermal structure 42. For example, the configuration of the flow dividers, for example, included in the thermal management structure will be different if the outlet conduit 78*b* was located at the outer wall 44*b* instead of at the outer wall 44*a* where the inlet conduit 78*a* is also located. In another example, the configuration of the flow dividers will be different if an enclosure (described below) comprising five (5) walls, for example, is addictively manufactured as a monolithic structure in which one or more walls comprise an internal lattice structure for improved cooling and rigidity.

As shown in FIG. 3*b*, a front wall 60 is oriented vertically and configured to cover a front side of the battery pouches 39. A back wall 64 is oriented vertically and configured to cover a back side of the battery pouches 39. A top wall 70 is oriented horizontally and configured to cover a top side of the battery pouches 39. The front wall 60, the back wall 64, and the top wall 70 are secured to the thermal management structure 42 by welding or any other suitable attachment means. In this way, the thermal structure 42 and the walls, 60, 64, and 70 cooperate to form an enclosure, which provides a structural surrounding and sealed compartment for the battery pouches 39.

The thermal management structure 42 of the present disclosure provides multiple functions such as load paths, thermal/heat transfer, and fluid flow paths. In some configurations, there may be only one battery pouch 39 instead of two battery pouches 39. In such configuration, the intermediate wall 44*c* of the thermal management structure 42 may be removed such that cooling is provided by the outer walls 44*a*, 44*b* and the bottom wall 44*d*. In another example, an enclosure comprising five (5) walls (e.g., two outer walls, a top wall, a back wall and a bottom wall) is addictively manufactured as a monolithic structure in which one or more walls comprise an internal lattice structure as described above to provide improved cooling and rigidity. In such example, the battery pouch 39 is inserted from a front opening of the enclosure and the front opening is closed off by a cover member secured to the enclosure. In yet another example, there may be three or more battery pouches 39. In such example, there may be two or more intermediate walls separating the battery pouches 39 such that cooling is provided by the outer walls 44*a*, 44*b*, the bottom wall 44*d*, and the plurality of intermediate walls.

In other examples, the battery array 32 and the thermal management structure 42 are incorporated into the vehicle frame 12 of the vehicle 10 such that the vehicle frame 12 acts as the battery housing.

Figure 12:
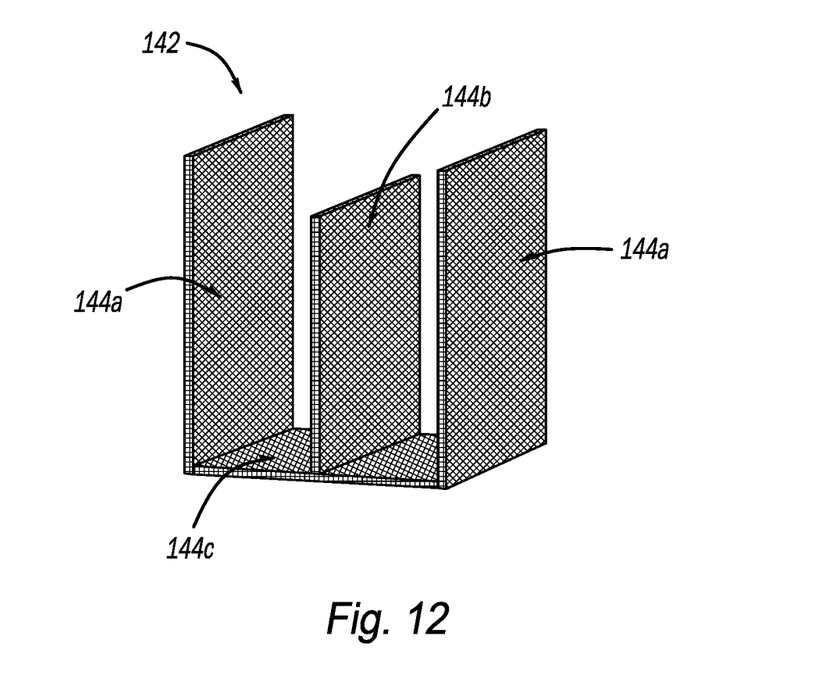
FIG. 12 is a perspective view of another structure of a battery array according to the principles of the present disclosure.

With reference to FIG. 12, another structure 142 is provided. The structure 142 may be incorporated into one of the battery arrays 32 described above instead of the structure 42. The structure 142 may be similar or identical to the structure 42 described above, apart from the differences described below.

The structure 142 is in the form of a single unitized, monolithic structure that can be manufactured by an additive manufacturing process. The structure 142 comprises a plurality of walls (e.g., a pair of outer walls 144a, an intermediate wall 144b, and a bottom wall 144c) surrounding and supporting the battery pouches 39. Each wall 144a, 144b, 144c comprises a lattice structure. In this way, the battery array 32 is rigid and lightweight while still providing adequate support of the battery pouches 39.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thermal management structure for a battery pouch of a vehicle battery pack, the thermal management structure comprising:
    a plurality of walls comprising first and second outer walls and an intermediate wall, each of the first and second outer walls in a heat transfer relationship with a respective outer side of the battery pouch, the intermediate wall disposed between the first and second outer walls and in a heat transfer relationship with an inner side of the battery pouch,
    wherein each of the first and second outer walls comprises a first lattice structure and the intermediate wall comprises a second lattice structure,
    wherein each of the first and second lattice structures is an interconnected lattice structure extending across a fluid flow path of a respective wall.

2. The thermal management structure of claim 1, wherein the thermal management structure is additively manufactured.

3. The thermal management structure of claim 1, wherein the first lattice structures are internal lattice structures disposed within the first and second outer walls and the second lattice structure is an internal lattice structure disposed within the intermediate wall.

4. The thermal management structure of claim 1, wherein each of the first and second outer walls contacts the respective outer side of the battery pouch to provide for the heat transfer relationship by thermal conduction between the first and second outer walls and the respective outer sides of the battery pouch, and wherein the intermediate wall contacts the inner side of the battery pouch to provide for the heat transfer relationship by thermal conduction between the intermediate wall and the inner side of the battery pouch.

5. The thermal management structure of claim 1, wherein the plurality of walls further comprise a bottom wall in a heat transfer relationship with a lower side of the battery pouch and configured to support the battery pouch, and wherein the bottom wall comprises a third lattice structure.

6. The thermal management structure of claim 5, wherein the third lattice structure is an internal lattice structure disposed within the bottom wall.

7. The thermal management structure of claim 5, wherein:
    each of the first and second outer walls comprises a first internal flow divider that separates the first and second outer walls into first and second flow regions;
    the intermediate wall comprises a second internal flow divider that separates the intermediate wall into third and fourth flow regions; and
    the bottom wall comprises a third internal flow divider that separates the bottom wall into fifth and sixth flow regions.

8. The thermal management structure of claim 7, wherein:
    the intermediate wall comprises a fourth internal flow divider and a fifth internal flow divider extending parallel to the second internal flow divider, the fourth internal flow divider disposed within the second flow region and separating the second flow region into first and second sub flow regions, the fifth internal flow divider disposed within the third flow region and separating the third flow region into third and fourth sub flow regions; and
    the bottom wall comprises a sixth internal flow divider extending perpendicular to the third internal flow divider, the sixth internal flow divider separating the fifth flow region into fifth and sixth sub flow regions and the sixth flow region into seventh and eight sub flow regions.

9. The thermal management structure of claim 1, wherein the first and second outer walls and the intermediate wall are in fluid communication with each other.

10. A thermal management structure for a battery pouch of a vehicle battery pack, the thermal management structure comprising:
    a plurality of walls comprising a pair of outer walls, an intermediate wall, and a bottom wall, each outer wall in a heat transfer relationship with a respective outer side of the battery pouch, the intermediate wall disposed between the pair of outer walls and in a heat transfer relationship with an inner side of the battery pouch, and the bottom wall in a heat transfer relationship with a lower side of the battery pouch and configured to support the battery pouch,
    wherein each of the outer walls comprises a first lattice structure, the intermediate wall comprises a second lattice structure, and the bottom wall comprises a third lattice structure, and
    wherein each of the first, second, and third lattice structures is an interconnected lattice structure extending across a fluid flow path of a respective wall.

11. The thermal management structure of claim 10, wherein the thermal management structure is additively manufactured.

12. The thermal management structure of claim 10, wherein the first lattice structures are internal lattice structures disposed within the outer walls, the second lattice structure is an internal lattice structure disposed within the intermediate wall, and the third lattice structure is an internal lattice structure disposed within the bottom wall.

13. The thermal management structure of claim 10, wherein the pair of outer walls, the intermediate wall, and the bottom wall are in fluid communication with each other.

14. The thermal management structure of claim 10, wherein:
- each outer wall comprises a first internal flow divider that separates the outer wall into first and second flow regions;
- the intermediate wall comprises a second internal flow divider that separates the intermediate wall into third and fourth flow regions; and
- the bottom wall comprises a third internal flow divider that separates the bottom wall into fifth and sixth flow regions.

15. The thermal management structure of claim 14, wherein:
- the intermediate wall comprises a fourth internal flow divider and a fifth internal flow divider extending parallel to the second internal flow divider, the fourth internal flow divider disposed within the second flow region and separating the second flow region into first and second sub flow regions, the fifth internal flow divider disposed within the third flow region and separating the third flow region into third and fourth sub flow regions; and
- the bottom wall comprises a sixth internal flow divider extending perpendicular to the third internal flow divider, the sixth internal flow divider separating each of the fifth and sixth flow regions into fifth and sixth sub flow regions.

16. The thermal management structure of claim 10, wherein:
- each outer wall contacts the respective outer side of the battery pouch to provide for the heat transfer relationship by thermal conduction between the outer walls and the respective outer sides of the battery pouch;
- the intermediate wall contacts the inner side of the battery pouch to provide for the heat transfer relationship by thermal conduction between the intermediate wall and the inner side of the battery pouch; and
- the bottom wall contacts the lower side of the battery pouch to provide for the heat transfer relationship by thermal conduction between the bottom wall and the lower side of the battery pouch.

17. A thermal management structure manufactured by an additive manufacturing process, the thermal management structure comprising:
- a plurality of walls comprising a pair of outer walls and an intermediate wall, each outer wall in a heat transfer relationship with a respective outer side of a battery pouch, the intermediate wall disposed between the pair of outer walls and in a heat transfer relationship with an inner side of the battery pouch,
- wherein each of the outer walls comprises a first lattice structure and the intermediate wall comprises a second lattice structure, and
- wherein each of the first and second lattice structures is an interconnected lattice structure extending across a fluid flow path of a respective wall.

18. The thermal management structure of claim 17, wherein the first lattice structures are internal lattice structures disposed within the outer walls and the second lattice structure is an internal lattice structure disposed within the intermediate wall.

19. The thermal management structure of claim 18, wherein the plurality of walls further comprise a bottom wall in a heat transfer relationship with a lower side of the battery pouch and configured to support the battery pouch, and wherein the bottom wall comprises a third lattice structure.

20. The thermal management structure of claim 19, wherein the third lattice structure is an internal lattice structure disposed within the bottom wall.

* * * * *